United States Patent [19]

Taylor

[11] 4,275,096

[45] * Jun. 23, 1981

[54] METHOD AND APPARATUS FOR DISPENSING FLUID IN A CONDUIT

[75] Inventor: Philip W. Taylor, Burnet, Tex.

[73] Assignee: Taylor Industries, Inc., Marble Falls, Tex.

[*] Notice: The portion of the term of this patent subsequent to Feb. 6, 1995, has been disclaimed.

[21] Appl. No.: 3,508

[22] Filed: Jan. 15, 1979

Related U.S. Application Data

[63] Continuation-in-part of Ser. No. 894,565, Apr. 7, 1978, Pat. No. 4,137,623.

[51] Int. Cl.³ .......................... B05C 1/06; B05D 1/28; B05D 7/22
[52] U.S. Cl. .................................. 427/230; 118/105; 118/108; 118/109; 118/254; 118/255; 118/264; 118/DIG. 10; 184/15 R; 184/19; 184/18; 427/239; 427/429; 29/433
[58] Field of Search ............... 118/207, 215, 105, 108, 118/408,109, DIG. 10, 254, 255, 264; 427/239, 230, 429; 184/15 R, 18, 19; 29/433

[56] References Cited

U.S. PATENT DOCUMENTS

| | | | |
|---|---|---|---|
| 3,061,043 | 10/1972 | Malloy | 184/15 R |
| 3,605,251 | 9/1971 | Salerno et al. | 118/408 X |
| 3,605,947 | 9/1971 | Salerno et al. | 118/408 X |
| 4,108,279 | 8/1978 | Marcell | 184/15 R |
| 4,137,623 | 2/1979 | Taylor | 427/239 X |

*Primary Examiner*—Shrive P. Beck
*Attorney, Agent, or Firm*—Hauke and Patalidis

[57] ABSTRACT

A method and apparatus for dispensing a fluid in a conduit and more particularly for dispensing lubricant within an electrical conduit for facilitating pulling electrical cables through the conduit. The apparatus is in the form of a cartridge disposed in the conduit at an end thereof. The cartridge is made of a pair of sealed and separable members. One of the members is a flanged sleeve forming the casing of the cartridge, in which is coaxially disposed the other member forming a tubular support member or carrier for a mass of resilient and absorbent lubricant impregnated porous material compressibly packed between the inner surface of the sleeve casing and the carrier. A cable pulling strand, or fishtape, is passed through the tubular carrier, and the cables to be pulled through the conduit are attached to the end of the fishtape. A plug inserted in the open end of the tubular carrier prevents the fishtape and the cables attached thereto from being pulled back through the carrier. The carrier separates from the sleeve casing when a pull is exerted on the other end of the fishtape. The mass of resilient and absorbent material supported by the carrier expands to the inner diameter of the conduit when leaving the sleeve casing and absorbs part of an additional supply of lubricant contained in the cartridge. Pulling the lubricant-impregnated mass of resilient and absorbent material on the carrier ahead of the electrical cables coats the wall of the conduit with a film of lubricant.

13 Claims, 10 Drawing Figures

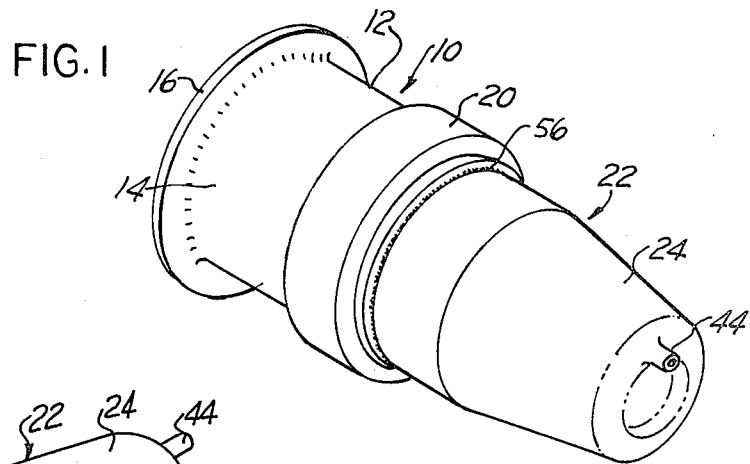
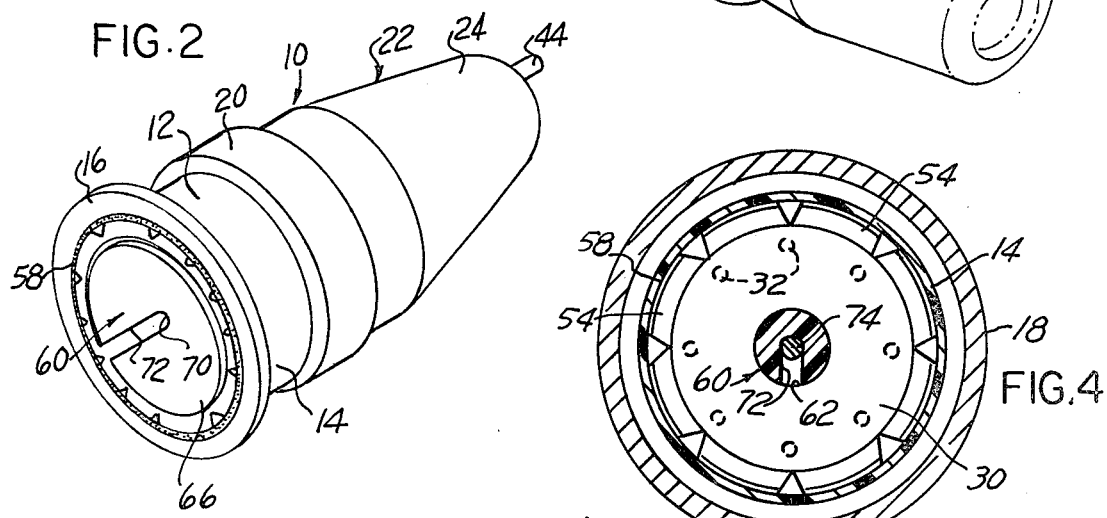
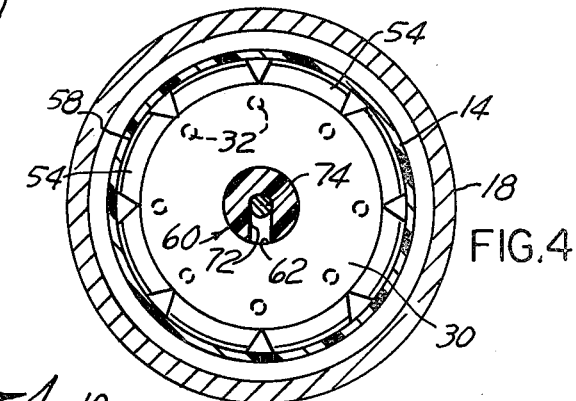
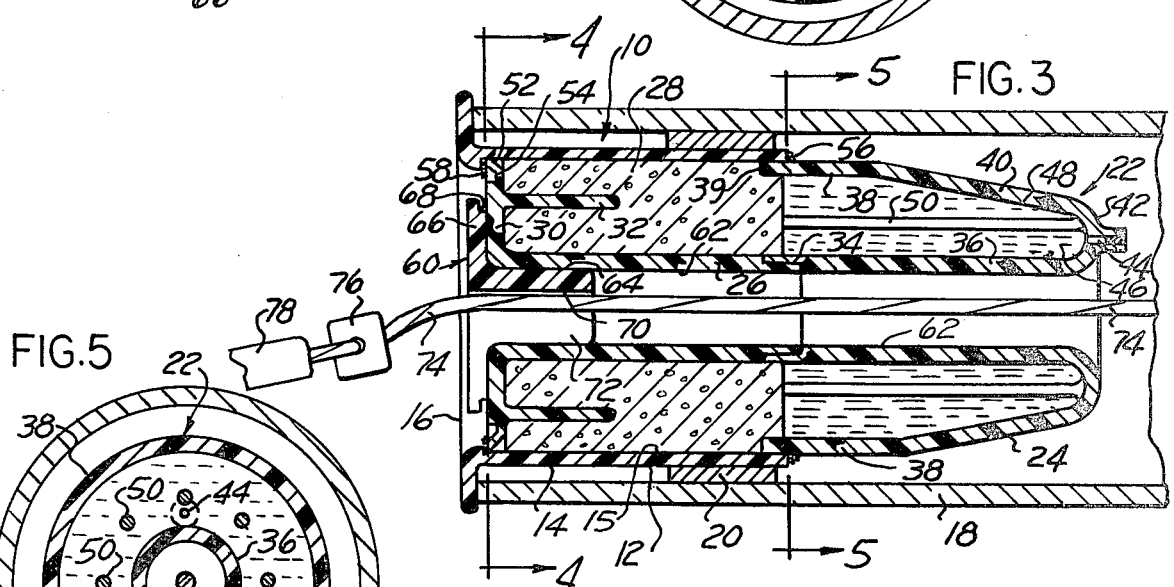
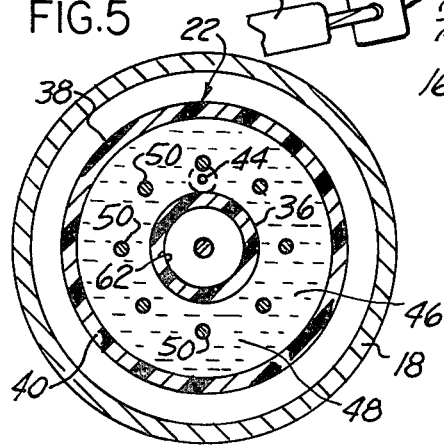
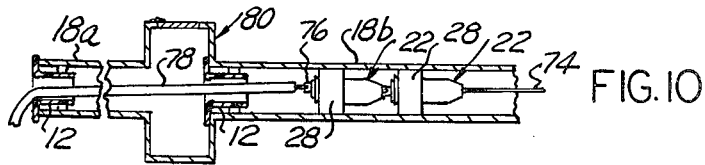

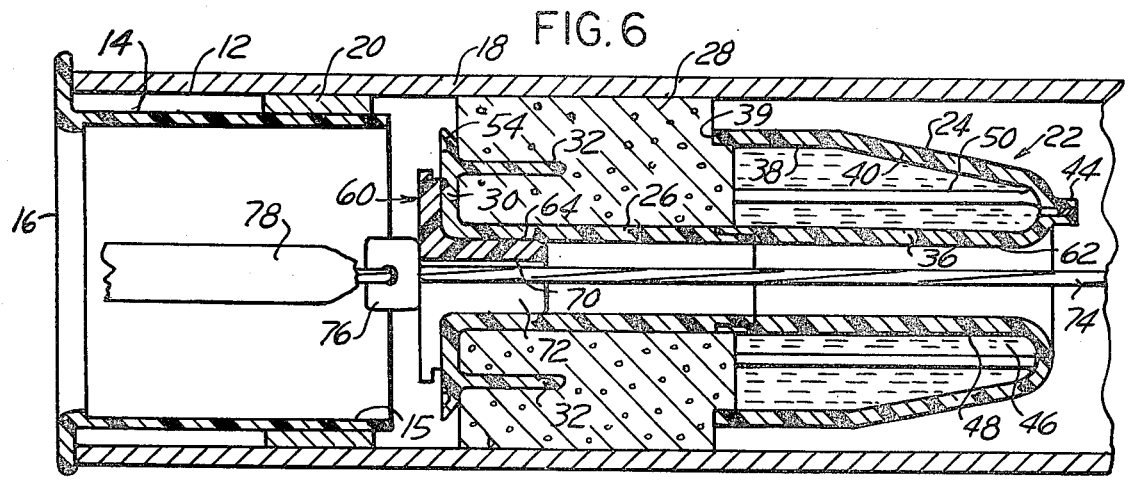
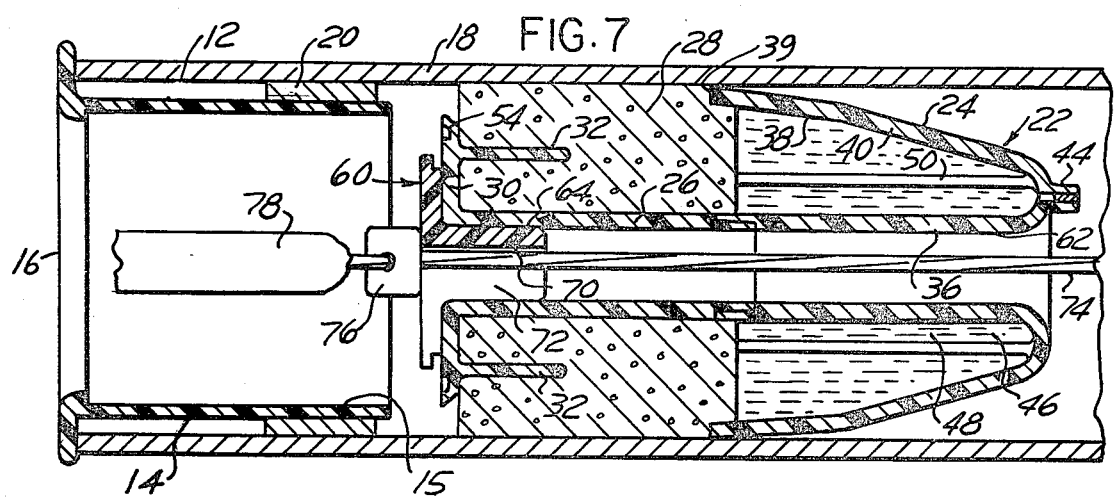
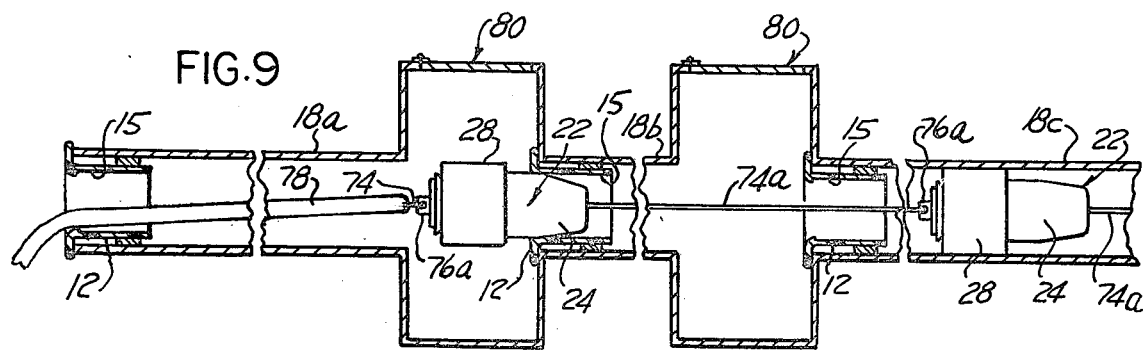
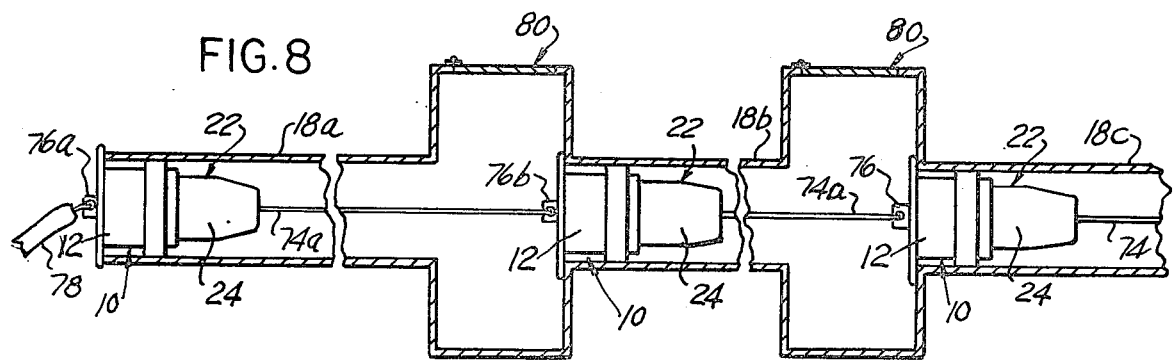

METHOD AND APPARATUS FOR DISPENSING FLUID IN A CONDUIT

CROSS-REFERENCE TO RELATED APPLICATIONS

The present application is a continuation-in-part of application Ser. No. 894,565, filed Apr. 7, 1978 now U.S. Pat. No. 4,137,623.

BACKGROUND OF THE PRESENT INVENTION

The present invention relates to a method and means for dispensing a fluid within a pipe or conduit and more particularly for dispensing a lubricant for facilitating cable pulling and installation of electrical cables in an extended conduit.

Electrical wiring of buildings, and more particularly of commercial and industrial buildings, is generally effected by installing a plurality of conduits under the floors or above the ceilings and through the walls from end to end of the buildings, between an electrical inlet station and a plurality of distribution outlets and connection boxes. Electrical cables are installed in the empty conduits by first placing a flexible pull strand, or fishtape, by pushing it through a given length of conduit, from a connection box to another, or from one end of the conduit to the other. The electrical cables to be pulled through the conduit are attached to an end of the fishtape, and the other end of the fishtape is manually, or mechanically, pulled such as to pull the electrical cables from one end of the conduit to the other.

In installations where the conduit is relatively long, or where there are bends in the conduit, lubricant is applied to the surface of the electrical cables as they enter the conduit, in order to reduce as much as possible the friction between the electrical cable peripheral surface and the inner surface of the conduit wall. While one man pulls on the fishtape at one end of the conduit, another man smears a paste lubricant on the electrical cables entering the conduit at the other end or, in the alternative, wipes the electrical cables with a rag impregnated with lubricant, or squirts lubricant on the cables. The electrical cables are very slippery, which prevents the man at the inlet of the conduit from helping by pushing the cables into the conduit, and the lubricated cables being inserted in the conduit accumulate dirt and grit from anything they touch. Furthermore, most of the lubricant coating the electrical cables is transferred to the conduit wall proximate to the inlet of the conduit, and very little lubricant remains on the surface of the cables where it is most needed at bends and further down the conduit.

Diverse attempts have been made in the past to overcome the inconveniences of manually lubricating electric cables prior to pulling through a conduit. For example, U.S. Pat. Nos. 3,605,251 and 3,605,947 disclose permanently installing rupturable containers of lubricant in an electrical conduit, at predetermined locations along a run of conduit. The containers are broken during installation of electrical cables, thus releasing the lubricant and reducing the friction between the cables and the conduit wall during pulling of the cables through the conduit. The inconveniences of such an arrangement are many, as it requires modifications of conventional electrical conduits, lubricant is available only when electrical cables are first installed through a conduit, and manual lubrication must be resorted to when additional cables are passed through the conduit at some later date.

U.S. Pat. No. 3,858,687 discloses low profile flexible rupturable lubricant containers attached at appropriate locations along an electrical cable being pulled through a conduit. The containers are ruptured by pressure when the cable is pulled through zones of heavy friction between the cable and the conduit wall, thus releasing the lubricant. Such a lubricating system is complicated, and there is no assurance that lubricant will be provided where most needed, or that not all the lubricant will be exhausted prior to finishing pulling an electrical cable through a conduit.

U.S. Pat. No. 3,908,799 discloses an apparatus and method for pre-lubricating a conduit interior prior to inserting electrical cables therethrough. The lubricant is contained in tubing sections interconnected by rods. The tubing sections are provided with an aperture through which lubricant is dispensed by progressively squeezing the tubing sections by means of clamping loops forming parts of the rods and by relatively displacing the tubing sections and the clamping loops. Such an arrangement requires that the conduit be empty so as to afford passage through the conduit for the tubing sections containing the lubricant and the accompanying rods. Application of lubricant through the conduit is somewhat haphazard and difficult to be effected.

U.S. Pat. No. 3,438,461 discloses a collapsible bag filled with lubricant which is attached between a fishtape and the end of the electrical cables being pulled through a conduit. The collapsible bag is filled with lubricant and is contained in a flexible sleeve, which is caused to extend as a function of the tension exerted on the fishtape so as to contract the sleeve peripherally and expel lubricant from the collapsible bag. Such an arrangement also presents the inconvenience of applying lubricant in a haphazard manner, and the lubricant applicator may be completely emptied right at the beginning of a run, such that very little lubricant, if any, is applied to the conduit walls towards the end of the run.

The disadvantages of the prior art are remedied by the present invention which provides a method and means for evenly applying lubricant all along the length of a conduit, which requires very little lubricant, which coats the conduit wall with lubricant where it is most needed, which does not leave an excess of lubricant in the conduit, which permits to lubricate electric cables, and the like, only after they have been introduced in the conduit, and then only as a result of engagement with the surface of the conduit wall, which is in the form of a sealed cartridge having its own supply of lubricant and therefore avoiding contamination of lubricant remaining in an opened container, which, in addition to lubricating the wall of the conduit simultaneously with the installation of electrical cables therein, also cleans the wall free of dirt, and which provides a smooth low friction bearing remaining at the inlet of the conduit which prevents damaging contact between the electrical cable periphery and the sharp edge of the conduit end.

SUMMARY

The present invention accomplishes its many objects by providing a cartridge lubricator in the form of a sleeve casing containing a separable lubricant applicator in the form of a lubricant-impregnated resilient and absorbent mass of elastomeric or foamed material which is normally held under compression within the casing and which is capable of elastically expanding to the diameter of the conduit when severed from the casing. The applicator is disposed on a tubular substantially rigid carrier unit through which is passed the fishtape used for pulling electrical wires or cables through the conduit. The carrier unit thus mounted at the trailing end of the fishtape is pulled ahead of the electrical cable during installation of the cable in the conduit, automatically coating the inner wall of the conduit with a required amount of lubricant.

The improved cartridge lubricator disclosed in the application is provided on its forward end with a streamlined nosepiece containing an additional supply of lubricant, a portion of which is absorbed by the cellular mass of elastomeric material upon initial expansion and the remaining of which replenishes the lubricant soaking the elastomeric material as it is progressively exhausted. The streamlined nosepiece is forwardly tapered such as to facilitate pulling around bends and such as to function as a pilot for guiding the applicator through the empty sleeve causing remaining at the inlet of each pipe length between intermediary connection or pull boxes, in installations when a plurality of lubricators according to the present invention are placed at intervals through a conduit of substantial length provided with intermediary connection boxes. In addition, the streamlined nosepiece may be molded of a resilient plastic material and placed in the sleeve casing under compression, such as to expand to the diameter of the conduit when pulled from the casing, with the result that it acts as a means for wiping the conduit wall ahead of the lubricant applicator and as an effective seal preventing lubricant from dripping down the conduit when the lubricant carrier and applicator is pulled through an inclined conduit.

The many objects and advantages of the present invention will become apparent to those skilled in the art when the following description of the best mode contemplated for practicing the invention, given for illustrative purposes only, is read in conjunction with the accompanying drawing, wherein:

BRIEF DESCRIPTION OF THE DRAWING

FIGS. 1 and 2 are perspective view of an example of cartridge lubricator according to the present invention;

FIG. 3 is a longitudinal section therethrough, shown installed at the inlet of a conduit;

FIG. 4 is a cross-section along line 4—4 of FIG. 3;

FIG. 5 is a cross-section along line 5—5 of FIG. 3;

FIG. 6 is a view similar to FIG. 3 but showing the lubricant applicator portion of the assembly being pulled through a conduit;

FIG. 7 is a view similar to FIG. 6 but showing a modification of the lubricant applicator portion of FIG. 6;

FIG. 8 is a schematic view showing a plurality of lubricating cartridges according to the present invention disposed at different locations at the conduit section inlets in pull or connection boxes in an electrical conduit of substantial length; and FIGS. 9 and 10 are schematic views similar to FIG. 8 but showing the lubricating cartridges in use while pulling a cable through the conduit.

DETAILED DESCRIPTION OF THE PREFERRED EMBODIMENT

Referring to the drawing, and more particularly to FIGS. 1-3, a conduit lubricant applicator cartridge 10 according to the present invention comprises a casing 12 in the form of a sleeve 14 having a longitudinal bore 15 and provided with an integral flange 16 on one end, the periphery of the flange 16 having a diameter larger than the inner diameter of an electrical pipe or conduit 18, FIG. 3, in the inlet of which the cartridge 10 is placed prior to pulling electric wire or the like through the conduit. The outer diameter of the casing 12 has a dimension permitting it to fit freely within the conduit 18, and the peripheral surface of the casing sleeve 14 is provided at its forward end with an annular member 20 made of compressible elastomeric material or, alternatively, of several turns of resilient self-adhesive tape such as plastic or rubberized tape, such that by removing an appropriate number of tape turns the outer diameter of the annular member 20 may be adapted to frictionally fit the inner wall of the conduit 18. The purpose of the resilient and/or adjustable, in diameter, annular member 20 is to provide a sturdy and centered fitting of the lubricant applicator cartridge 10 within the conduit 18, while at the same time forming an efficient seal retaining in the conduit to a certain degree surplus lubricant which may drip along the wall of the conduit, especially when the lubricant applicator cartridge is disposed at the inlet of a vertically positioned conduit 18.

The forward end of the lubricant applicator cartridge 10 is provided with a separable nosepiece portion 22 having an integral tapered leading portion 24. As best shown in detail at FIGS. 3-5, the separable nosepiece portion 22 is formed integral with a generally tubular carrier 26 supporting on its periphery an annular core 28 of resilient and fluid-absorbent cellular material coaxially disposed and compressed within the bore of the casing sleeve 14. The rear end of the carrier 26 is provided with an integral flange 30 having a plurality of circularly disposed integral prongs 32 forwardly projecting into the mass of the resilient and fluid-absorbent annular core 28 for the purpose of holding it circularly in position around the periphery of the carrier 26. The carrier 26 with its integral flange 30 and prongs 32 is preferably made of a substantially rigid plastic molding and, although the nosepiece 22 could be molded integrally with the carrier 26, to facilitate manufacture and to permit, if so desired, the use of a different type of plastic for forming the nosepiece 24, the two elements are preferably molded separately and assembled by cementing or heat-welding, along a joint as shown at 34. The nosepiece 22, per se, is formed with an annular inner wall 36 aligned with the carrier 26 and a peripheral wall having a substantially cylindrical portion 38 having a terminal edge 39 engaged within the forward end of the bore 15 and an integral tapered portion 40 forming the tapered outer surface 24. The inner wall 36 and the peripheral tapered wall portion 40 are integrally joined by an annular, curvilinear in section, end wall 42 provided with at least one nipple 44 permitting to fill the annular chamber 46 thus defined with a fluid such as a lubricant 48. After filling the annular chamber 46 with the lubricant 48, a portion of which thus also pre-soaks to a certain degree the resilient fluid-absorbent cellular material of the annular core 28, the nipple 44 is heat-sealed or plugged. A plurality of circulary disposed longitudinal ribs (not shown) or rods 50 are formed integrally in the nosepiece 22 and help in holding the core 28 in position and preventing it from being accidentally displaced forwardly.

For the purpose of preventing the separable subassembly consisting of the nosepiece 22 including the carrier 26 and the annular core 28 of resilient and fluid-absorbing cellular material from accidentally separating rearwardly from the sleeve 14 of the casing 12, the inner surface of the sleeve 14 is provided proximate its rear end with an abutment shoulder 52 engaging the edge of serrated lips 54 formed integrally at the peripheral edge of the carrier flange 30. The serrated lips 54, best shown at FIG. 4, define a circular abutment in engagement with the annular shoulder 52 preventing such rearward motion of the nosepiece-carrier unit, but they are nevertheless able to flex for permitting passage through casing sleeves disposed at intervals at pulling boxes through a conduit, as will be hereinafter explained in further detail.

A seal made for example of an annular plastic film is placed at the junction between the sleeve 14 of the casing 12 and the peripheral surface of the nosepiece 22, as shown at 56, and also as shown at 58 at the junction between the outer surface of the carrier flange 30 and the inner surface of the sleeve 14. A plug 60 is disposed in the rear end of the bore 62 defined through the tubular carrier 62, the plug 60 having a peripheral cylindrical surface 64 fitting the bore 26 and a flange 66 engaging the rear surface of the carrier flange 30. The plug is removable from the end of the bore 62 and the edge of its flange 66 has a recessed shoulder or step 68 permitting to insert the tip of a screwdriver blade for facilitating removal of the plug. The plug 60 has an internal longitudinal bore 70, and a radial slot 72 extends all the way through the sidewalls of the plug.

In use, the lubricant applicator cartridge 10 of the invention is placed at the inlet of a pipe or conduit 18 in the position illustrated at FIG. 3. The plug 60 is removed and the end of a pull strand or fishtape 74 provided with a tying tab 76 is disposed through the bore 62. The plug 60 is threaded over the pull strand or fishtape 74 through its lateral slot 72, and is reinserted on the end of the carrier bore 62. A bundle of wires or a cable 78 is attached to the tying tab 76, and when a pull is exerted on the end of a pull strand or fishtape 74, the tying tab 76 engages the rear of the plug 60, and the pull is transmitted to the carrier 26. The carrier 26 and the nosepiece 22 integral therewith separate from the sleeve 14 of the casing 12, as illustrated at FIG. 6, breaking the annular seals or diaphragms 56 and 58. The casing 12 is prevented from being displaced by its outwardly extending flange 16 engaging the end edge of the conduit 18. The carrier 26 being displaced forwardly, as soon as the resilient pre-impregnated annular core 28 leaves the interior of the sleeve 14, it expands to the nominal internal diameter of the conduit 18. During expansion, and while the lubricant impregnated annular core 28 resumes its relatively relaxed original shape and diameter as limited, however, by the inner diameter of the conduit 18, a portion of the lubricant 48 contained in the chamber 46 in the nosepiece 22 is absorbed by the annular core 28. The remaining of the reserve of lubricant 48 is held in the chamber 46 and is progressively absorbed by the annular core 28 as the lubricant becomes peripherally exhausted from the annular core material while coating the inner wall of the conduit 18. Furthermore, the annular core 28, in addition to coating the inner wall surface of the conduit 18 with a thin film of lubricant, wipes the conduit wall clean from any dirt which may be present.

FIG. 7 illustrates a modification of the structure illustrated at FIG. 6 wherein the nosepiece 22 is molded of relatively resilient material, such as a resilient plastic, which, in the assembled position illustrated at FIG. 3 causes the rear peripheral edge 39 of the nosepiece 22 to be held compressively within the inner bore 15 of the sleeve 14 at its forward end. When the nospiece 22, in unison with the carrier 26, separates from the sleeve 14, the peripheral trailing edge 39 of the nosepiece 22, the cylindrical wall portion 38 thereof and the tapered wall portion 40 expand to the shape illustrated at FIG. 7, such as to provide a streamlined conical shield for the lubricant applying annular core 28.

The structure of the present invention for a conduit lubricant applicator cartridge is particularly advantageous for lubricating lengthy conduits while simultaneously pulling wires and cables through the conduit. Such an arrangement is schematically illustrated at FIG. 8 wherein separate lengths of conduits 18a, 18b and 18c, for example, are disposed end-to-end with connections or pull boxes, such as shown at 80, placed between consecutive lengths of conduit. With such an arrangement, it may be desirable to place a lubricant applicator cartridge 10 at the inlet of each conduit length 18b, 18c in each connection or pull box 80 and one lubricant applicator cartridge 10 at the inlet of the first pipe length 18a. The pull strand or fishtape 74 provided with its tying tab 76 is passed through the first lubricant applicator cartridge 10 and a length of intermediary pull strand or fishtape 74a is attached to the tying tab 76. The typing tab 76a of the pull strand or fishtape length 74a provide an attachment means for the end of a further intermediary pull strand or fishtape 74a provided at its other end with a tying tab 76a to which is attached the length of cable or wire 78. When a pull is exerted on the free end of the pull strand or fishtape 74, the wires or cable 78 are pulled through the conduit preceded by the nosepiece 22-carrier 28 assemblies thus adapted each to pre-lubricate a predetermined length of conduit such as conduit lengths 18a, 18b and 18c. As illustrated at FIG. 9, the conical end 24 of the nosepiece 22 acts as a tapered pilot element facilitating introduction and passage of the nosepiece together with the carrier and the extended annular core 28 through the bore 15 of consecutive empty cartridge casings 12 remaining in position at the inlets of each conduit length. It will also be appreciated that the tapered nosepiece, in addition, facilitates pulling around bends and passage of the carrier and annular core through restrictions in the conduit.

Alternatively, as schematically illustrated at FIG. 10, the intermediary pull strands or fishtapes may be omitted, and a single pull strand or fishtape 74 with its tying tab 76 is passed through all the nosepiece 22-carrier 28 assemblies, the bundle of wires or cables 78 being attached to the tying tab 76 on the end of the pull strand or fishtape 74. When a pull is exerted on the free end of the pull strand or fishtape 74, the nosepiece 22-carrier 28 assembly of the first lubricant applicator cartridge is pulled from the first sleeve casing 12 fitted in the inlet of the conduit length 18a, thus pulling behind it the wires or cable 78. When the nosepiece 22 of the first nosepiece-carrier assembly engages the rear of the second nosepiece-carrier assembly of the applicator cartridge fitted at the inlet of the second conduit length 18b, the second nosepiece-carrier assembly is pulled away from its sleeve casing 12 and pushed through the conduit length 18b by and ahead of the first nosepiece-carrier assembly. In this manner, a fresh applicator for each conduit length is pushed ahead by the preceding nosepiece-carrier assembly, whose supply of lubricant or other fluid has been used up for coating the wall of the preceding conduit length. The fresh applicator coats the conduit wall with a film of fluid, and any excess fluid is wiped by the following applicator or applicators.

It will also be appreciated that although the present invention has been described as a device and a method for applying a thin film of lubricant to the interior wall of a conduit while pulling through the conduit electric wires, cables and the like, fluids other than lubricant may be applied to the internal wall of a pipe or conduit. Such fluids may be for example a cleaning fluid, a paint, a solvent, a protective coating, and the like.

Having thus described the present invention by way of a structural embodiment thereof and of examples of use thereof, modifications thereof will be apparent to those skilled in the art, what is claimed as new is as follows:

1. An apparatus for dispensing a fluid in an extended conduit comprising a cartridge-like structure made of a pair of coaxial assembled separate inner and outer members dispoed one within the other and insertable in an end of said conduit in a fixed position, means attaching the end of a pull strand to said inner member for separating said inner member from said outer member by pulling tension exerted by said pull strand, a resilient absorbent mass of cellular material supported by said inner member and normally compressibly held between said inner and outer members and capable when pulled from said outer member of expanding such as to be peripherally engaged with the wall of said conduit, means integral with said outer member adapted to retain said outer member in the conduit upon said separation, a supply of said fluid associated within said structure and adapted to be applied to said conduit by said expanded cellular material when moved through said conduit by said pull strand, and a nosepiece member integral with said inner member and defining a chamber containing an additional supply of said fluid.

2. The apparatus of claim 1 wherein said nosepiece member has an outer wall portion of forwardly decreasing diameter.

3. The apparatus of claim 1 wherein said outer wall is compressively held within said outer member at the junction between said outer member and said nosepiece member, said outer wall upon separation from said outer member being expandable toward said conduit wall.

4. The apparatus of claim 2 wherein said outer wall is compressively held within said outer member at the junction between said outer member and said nosepiece member, said outer wall upon separation from said outer member being expandable toward said conduit wall at its portion of greater diameter.

5. The apparatus of claim 1 wherein said outer member is a sleeve casing and said means integral with said outer member is a flange portion on said sleeve casing of a diameter larger than the inner diameter of said conduit and a peripheral annular member on said sleeve casing conformable to the inner diameter of said conduit.

6. The apparatus of claim 1 wherein said mass of cellular material is in the form of an annular member supported by said inner member having an end flange engaging a side of said annular member.

7. The apparatus of claim 6 wherein said inner member is tubular and the end of said pull strand is passed through the bore of said tubular member, the end of said pull strand having means for attaching thereto an electrical cable and the like.

8. The apparatus of claim 7 wherein said means for attaching said pull strand comprises a slotted plug mounted in the end of said bore in said inner member.

9. The apparatus of claim 1 wherein said fluid is a lubricant.

10. A method for coating with a fluid the interior wall of an extended conduit, said method comprising fixedly placing in the end of said conduit a fluid applicator comprising a sleeve casing and a separable carrier-supported mass of resilient fluid-absorbent and impregnated material in a partially compressed state, attaching the end of a pull strand to said carrier, exerting a pull by means of said pull strand so as to separate said carrier and mass of fluid impregnated material as a unit from said sleeve casing and pull said mass of resilient material in an expanded state after leaving said sleeve casing through said conduit with the peripheral surface of said material in engagement with the wall surface of said conduit, providing in said cartridge a supply of said fluid, and causing a part of said fluid to be absorbed by said resilient material when passing from a compressed to an expanded state, wherein an additional supply of said fluid is disposed in a chamber in a nosepiece member integral with said carrier.

11. The method of claim 10 wherein said fluid is a lubricant and further comprising attaching an electrical cable to said carrier for simultaneously pulling said cable through said conduit behind said carrier.

12. The method of claim 10 further comprising placing at least a second cartridge fluid applicator at some distance in said conduit, attaching the resilient material carrier of said second fluid applicator to the carrier of said first applicator, and exerting a pull on said pull strand for pulling said first applicator carrier behind said second applicator carrier in said conduit and through the sleeve casing of said second applicator.

13. The method of claim 12 wherein at least the resilient material of said second applicator is impregnated with a lubricant.

* * * * *

UNITED STATES PATENT AND TRADEMARK OFFICE
CERTIFICATE OF CORRECTION

PATENT NO. : 4,275,096

DATED : June 23, 1981

INVENTOR(S) : Philip W. Taylor

It is certified that error appears in the above-identified patent and that said Letters Patent is hereby corrected as shown below:

```
Column 5, line 24, change "62" to --26--.
          line 25, change "26" to --62--.
```

Signed and Sealed this

Third Day of August 1982

[SEAL]

Attest:

GERALD J. MOSSINGHOFF

Attesting Officer     Commissioner of Patents and Trademarks